United States Patent
Dillon et al.

(10) Patent No.: US 12,135,528 B2
(45) Date of Patent: Nov. 5, 2024

(54) SYSTEM AND METHOD FOR CURRENT FLOW MANAGEMENT

(71) Applicant: Dell Products L.P., Round Rock, TX (US)

(72) Inventors: Geoffrey Allen Dillon, Elgin, TX (US); Craig Anthony Klein, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 572 days.

(21) Appl. No.: 17/495,509

(22) Filed: Oct. 6, 2021

(65) Prior Publication Data

US 2023/0103633 A1    Apr. 6, 2023

(51) Int. Cl.
  *G06F 1/32* (2019.01)
  *G05B 13/02* (2006.01)
  *H02J 4/00* (2006.01)
  *H02J 13/00* (2006.01)

(52) U.S. Cl.
  CPC .............. *G05B 13/026* (2013.01); *H02J 4/00* (2013.01); *H02J 13/00006* (2020.01)

(58) Field of Classification Search
  CPC ........................................................ G06F 1/32
  USPC ........................................................ 700/291
  See application file for complete search history.

(56) References Cited

U.S. PATENT DOCUMENTS

| | | | |
|---|---|---|---|
| 11,119,142 B1 * | 9/2021 | Gaide | G01R 31/58 |
| 2012/0079299 A1 * | 3/2012 | Cepulis | G06F 1/263 |
| | | | 713/320 |
| 2013/0286523 A1 * | 10/2013 | Mullins | H01R 13/641 |
| | | | 439/620.21 |

* cited by examiner

*Primary Examiner* — Paul B Yanchus, III
(74) *Attorney, Agent, or Firm* — Womble Bond Dickinson (US) LLP

(57) ABSTRACT

Methods and systems for power management are disclosed. The disclosed power management may facilitate the use of different components that may have different electrical current capacity limitations. The current capacity limitations may be based on, for example, physical limitations of the components, regulatory limitations, organizational limitations, and/or other considerations. It may not be desirable to exceed the current capacity limitations. By implementing the disclosed power management methods, systems, and/or devices, operation of devices may be less likely to result in the current drawn through devices such as power cables exceeding the current capacity limitations even while other devices operably connected to the cables do not have such current capacity limitations.

20 Claims, 14 Drawing Sheets

SYSTEM AND METHOD FOR CURRENT FLOW MANAGEMENT

FIELD OF THE DISCLOSURE

Embodiments disclosed herein generally relate to power management. More particularly, embodiments disclosed herein relate to systems and methods to manage power consumption for power management.

BACKGROUND

Computing devices may store data and used stored data when performing computations. For example, computing devices may utilize data when providing computer implemented services. To provide the computer implemented services, the computing devices may consume electrical power to perform the computations. The electrical power may be obtained from a variety of sources.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
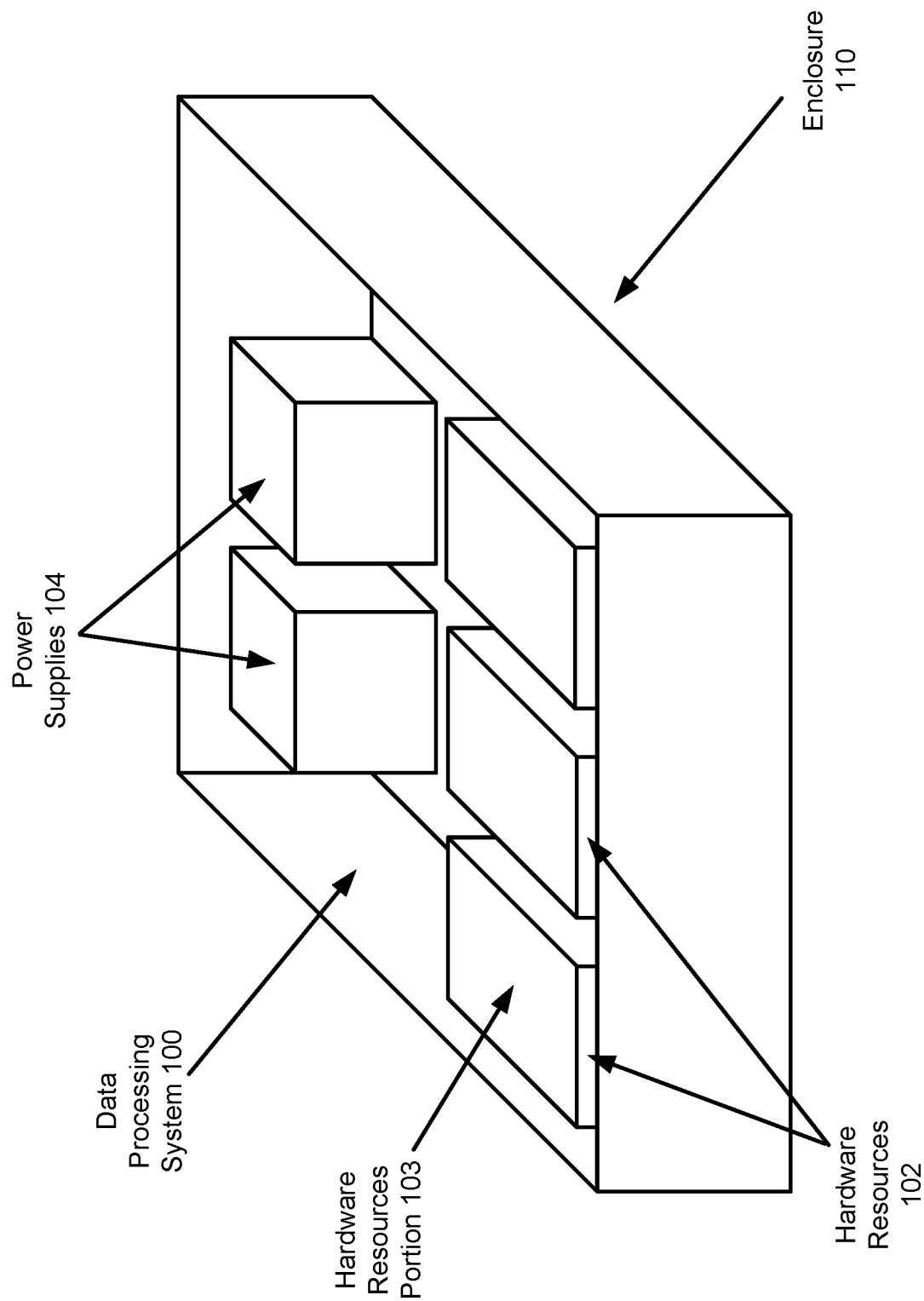
FIG. 1 is a diagram illustrating a system in accordance with an embodiment.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

In general, embodiments of the invention relate to methods and systems for power management. Specifically, the disclosed power management may facilitate the use of different components that may have different current capacity limitations (e.g., electrical current capacity limitations). The current capacity limitations may be based on, for example, physical limitations of the components, regulatory limitations, organizational limitations, and/or other considerations. It may not be desirable to exceed the current capacity limitations. By implementing the disclosed power management methods, systems, and/or devices, operation of devices may be less likely to result in the current drawn through devices such as power cables exceeding the current capacity limitations even while other devices operably connected to the cables do not have such current capacity limitations.

To provide the power management, multiple mechanisms may be employed. These mechanisms may be independent from one another thereby prevent failure of one of the mechanisms from resulting in power management failure.

In this manner, an embodiment disclosed herein may improve the likelihood of compliance with various types of current capacity limitations.

In an embodiment, a data processing system to provide computer implemented services is provided. The data processing system may include a power supply adapted to provide conditioned power using power from a power source; a power cable through which the power supply receives the power while the power cable is operably connected to the power supply and the power source; hardware resources adapted to: provide the computer implemented services while the data processing system is operating; and consume a portion of the conditioned power to provide the computer implemented services; a power manager adapted to: estimate an input current to the power supply that flows through the power cable; and gracefully reduce performance of the hardware resources when the estimated input current exceeds a first current level. The power supply may be adapted to: monitor the input current; and throttle the performance of the hardware resources when the input current exceeds a second current level, the second current level being larger than the first current level.

Gracefully reducing performance of the hardware resources may have a lesser impact on the computer implemented services than throttling the performance of the hardware resources.

The power supply may be adapted to receive a larger quantity of the input current than a quantity of current specified by the second current level.

The power manager may be further adapted to: obtain a power budget for the hardware resources based on a third current level associated with the power cable; and limit power consumption by the hardware resources based on the power budget.

Limiting the power consumption by the hardware resources based on the power budget may include obtaining the estimated input current based, at least in part, on the power budget and an input voltage to the power supply; when the estimated input current exceeds the first current level, reducing the power budget to obtain an updated power budget; when the estimated input current does not exceed the first current level, maintaining the power budget to obtain the updated power budget; and enforcing the updated power budget on the hardware resources.

The data processing system may also include a hardware resources manager adapted to: obtain information regarding the updated power budget; send a communication to a portion of the hardware resources via a sideband interface, the communication indicating a power consumption limit for the portion of the hardware resources, and the power consumption limit being based on the updated power budget.

Throttling the performance of the hardware resources may include sending an interrupt to a portion of the hardware resources, the interrupt being adapted to cause the portion of the hardware resources to reduce power consumption without consideration regarding impacts on the computer implemented services.

Gracefully reducing performance of the hardware resources may include identifying power consumption reduction mechanisms of the hardware resources; selecting a portion of the power consumption reduction mechanisms based on the computer implemented services; and invoking the portion of the power consumption reduction mechanisms to limit power consumption of the hardware resources based on the updated power budget without throttling the computer implemented services.

Obtaining the power budget may include identifying a quantity of power supplies that will supply the conditioned power to the hardware resources; identifying an efficiency of each power supply of the power supplies; calculating a maximum quantity of receivable power based on the based on the third current level; calculating a maximum quantity of output power for the power supplies based on the maximum quantity of receivable power and the efficiency; and setting the power budget based on the maximum quantity of the output power for the power supplies.

The data processing system may also include a second power supply adapted to provide the conditioned power using second power from a second power source; and a second power cable through which the second power supply receives the second power while the second power cable is operably connected to the second power supply and the second power source.

The power manager may also be adapted to configure the power supply to throttle the performance of the hardware resources when the input current exceeds the second current level; make a determination that the second power supply is not configurable to throttle the performance of the hardware resources; and disable the second power supply based on the determination.

The power manager may be further adapted to: estimate an aggregate input current to the power supply and the second power supply; obtain the estimated input current based on the estimated aggregate input current; obtain a second estimated input current based on the estimated aggregate input current, the second estimated input current being associated with the second power supply; and gracefully reduce the performance of the hardware resources when the second estimated input current exceeds the first current level.

The power supply may be unable to limit the input current below the first current level and the second current level.

Turning to FIG. 1, a diagram illustrating a system in accordance with an embodiment is shown. The system shown in FIG. 1 may be used to provide computer implemented services. The system may include, but is not limited to, data processing system 100 and enclosure 110. Each of these components is discussed below.

Data processing system 100 may provide the computer implemented services. When doing so, data processing system 100 may consume electrical power from other sources. To provide the computer implemented services, data processing system 100 may include hardware resources 102 and power supplies 104.

Hardware resources 102 may include any number of physical devices (e.g., processors, memory modules, storage devices, communications devices, etc.) that provide computing resources (e.g., processor cycles, transitory storage, persistent storage, communications bandwidth, etc.) usable to provide the computer implemented services. The computing resources may be used to support applications (e.g., computing instructions executing with the computing resources) hosted by data processing system 100. The applications may provide the computer implemented services. The computer implemented services may include any type and quantity of computer implemented services such as, for example, database services, data storage services, electronic communications services, etc.

When operating, hardware resources 102 may consume electrical power to provide the computing resources used to provide the computer implemented services. The hardware resources may utilize power from power supplies 104. Power supplies may include any number of physical devices (e.g., transformers, current/voltage sensors, controllers, etc.) usable to obtain power from power sources (not shown) and provide conditioned power to hardware resources 102 and/or other components. The power obtained from the power sources may be any form of power (e.g., alternating current) but the conditioned power may have specific characteristics (e.g., direct current of a predetermined voltage level) based on the hardware resources 102. For example, hardware resources 102 may not operate as expected when hardware resources 102 are provided with power that is not conditioned power.

To obtain the power (e.g., as input power) from the power source, power supplies 104 may be connected with one or more power cables. To provide the conditioned power to the hardware resources 102, power supplies 104 may output the conditioned power (e.g., as output power) to a bus or other power distribution structure. Hardware resources 102 may obtain the conditioned power through the bus.

The capacity for providing conditioned power may be dependent on the type of the power supplies. For example, different power supplies may have different output power ratings. When providing the conditioned power, the power supplies 104 may presume that the power cables used to obtain the power from the power sources are able to handle the quantity of current that will be drawn by the power supplies 104 through the power cables. However, if a power cable is not able to handle the quantity of drawn current, then the power cable may be out of compliance (e.g., regulatory compliance, design compliance) or otherwise be operating in an undesirable manner. As will be discussed in greater detail below, in an embodiment, methods and system are disclosed to reduce the likelihood of a power cable operating in an undesirable manner.

Enclosure 110 may include a physical structure for housing data processing system 100. The physical structure may be a form factor compliant structure such as, for example, a rack mount enclosure for a server. The physical structure may be other types of structures for housing data processing systems without departing from embodiments disclosed herein.

Enclosure 110 may include any number of sub-enclosures such as, for example, server chassis sleds, internal blocks, and/or other structures in which various portions of hardware resources 102 are positioned. In an embodiment, a hardware resources portion 103 positioned in a sub-enclosure operates as an independent computing device. Enclosure 110 may include any number of sub-enclosures that each include computing devices that operate independently and/or cooperatively to provide the computer implemented services.

While the system of FIG. 1 has been illustrated as including a limited number of specific components, a system may include different numbers, types, and/or quantities of components without departing from the embodiments disclosed herein.

Figure 2:
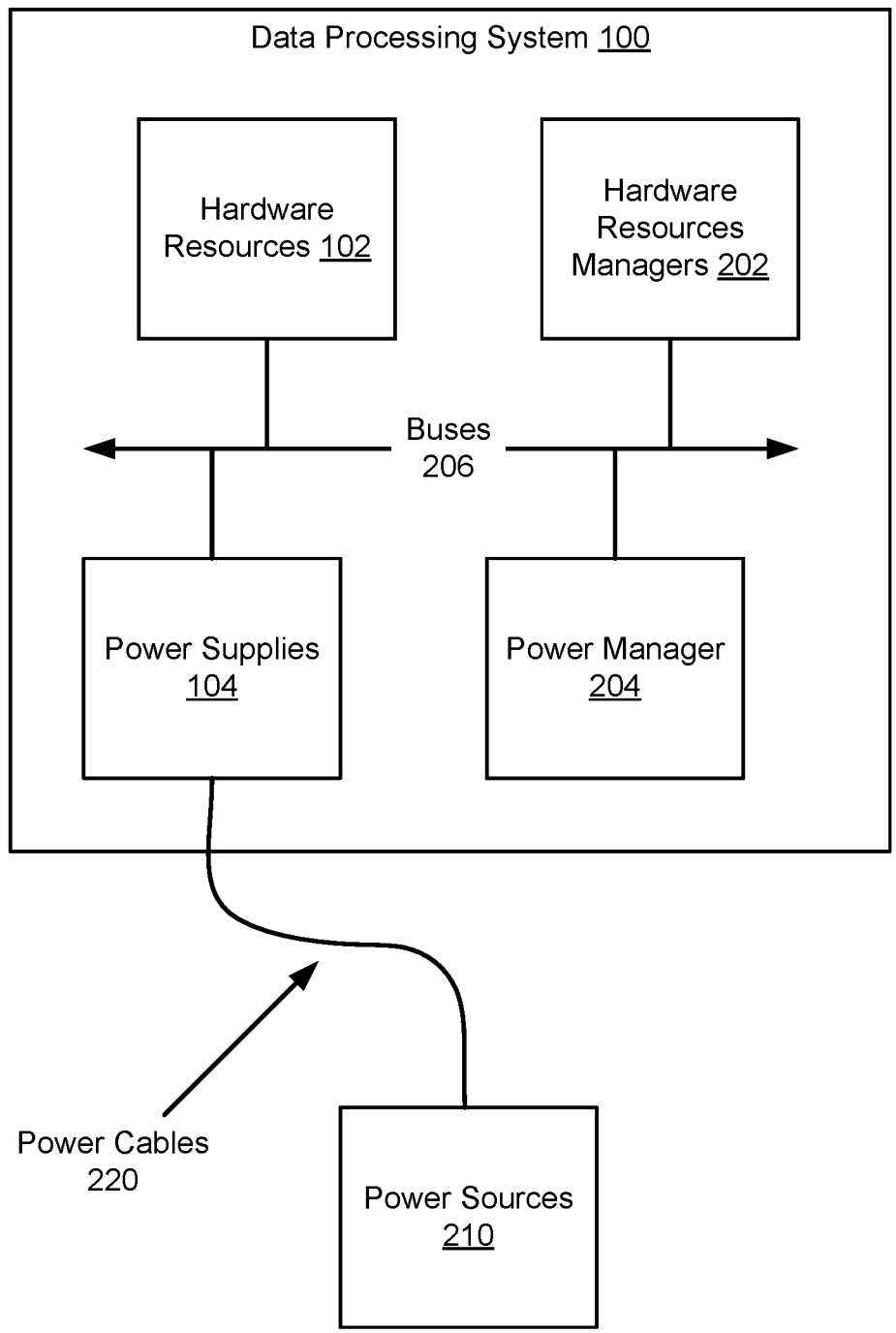
FIG. 2 is a block diagram illustrating a system in accordance with an embodiment.

Turning to FIG. 2, a block diagram of the system shown in FIG. 1 in accordance with an embodiment is shown. As discussed above, embodiments disclosed herein may reduce the likelihood of a quantity of current drawn through a power cable exceeding a current level associated with the power cable while computer implemented services are being provided by a system. To provide the aforementioned services, the system may include data processing system 100, power cables 220, and power sources 210. Each of these components is discussed below.

As previously noted, data processing system 100 may include hardware resources 102 and power supplies 104. The power supplies 104 may be capable of drawing an undesirable quantity of current through power cables 220. For example, power cables 220 may include de-rated cables. A de-rated cable may be a cable that includes one or more connectors that indicate that the de-rated cable is designed, rated, or otherwise only desirable to carry up to a first amount of current but having a length that is designed, rated, or otherwise only desirable to carry a lesser amount of current. Consequently, the de-rated cable may be capable of attachment to corresponding connectors on power supplies 104 that are designed to draw larger amounts of current than the lesser amount of current. Accordingly, normal operation of power supplies 104 may result in undesirable quantity of current being drawn through one or more of power cables 220.

To reduce the likelihood of undesirable quantity of current being drawn through power cables 220 (and/or for other purposes), data processing system 100 may include hardware resources managers 202, power manager 204, and buses 206. Each of these components is discussed below.

Power manager 204 may provide data process system level power management servers. These power management services may include (i) identifying a maximum quantity of current to flow through power cables 220, (ii) obtaining, based on the maximum quantity of current, a power budget for hardware resources 102, (iii) enforcing the power budget on the hardware resources 102, (iv) monitoring the input voltage (e.g., from power sources 210) to power supplies 104, (v) estimating current levels flowing through power cables 220 based on the monitored input voltage, (vi) updating the power budget based on the estimated current levels, (vii) enforcing the updated power budget on hardware resources 102, and (viii) configuring the power supplies 104 based on the maximum quantity of current and characteristics of the power supplies.

The power budget and estimated power budget may both be less than a maximum amount of power that the power supplies 104 are able to provide thereby attempting to reduce an amount of current drawn through power cables 220 to be less than the maximum quantity of current flow. The power budget and updated power budget may be enforced on hardware resources 102 by reducing the performance of these resources (which may reduce power consumption by these components and, in turn, reduce current drawn through power cables 220 by power supplies 104).

The maximum quantity of current may be identified through any means. For example, the maximum quantity of current may be stored in a data structure hosted by power manager 204, read from a remote location (e.g., a server) operably connected to power manager 204, may be inferred based on testing performed in cooperation with power supplies 104, may be obtain from power supplies 104 and/or power cables 220 (e.g., if power cables 220 include an identification mechanism), and/or via other methods. The maximum quantity of current may be based on, for example, local electrical regulations, building codes, operator determinations, and/or other factors.

Hardware resources managers 202 may provide granular power management servers. Different hardware resources managers 202 may manage power consumption by different portions of hardware resources 102. For example, consider a scenario where hardware resources 102 are arranged to form separately operating computing devices (e.g., which may each be housed in a sled of a chassis). In such a scenario, hardware resources managers 202 may each manage the power consumption by different computing devices to cooperatively manage the power consumption by hardware resources 102.

The granular power management services may include (i) obtaining copies of power budgets from power manager 204 (e.g., while power manager 204 is enforcing the power budgets), (ii) identifying a portion of power consumption mechanisms of hardware resources 102 usable to cause hardware resources 102 to consume power as specified by the power budgets, and/or (iii) invoke the identified portion of the power consumption mechanisms to attempt to place hardware resources 102 in compliance with the power budgets. In this manner, hardware resources managers 202 and power manager 204 may, in part, manage the quantity of current drawn through power cables 220 by power supplies 104 by modulating the power drawn by hardware resources 102 from power supplies 104.

The power consumption mechanisms may include, for example, modulation of clock speed or processors, memory modules, storage devices, communications devices, and/or other types of devices (collectively, "hardware devices"); suspending and/or resuming operation of various portions of the hardware devices; and/or other functions that may be usable at any level of granularity to reduce the performance (e.g., rates of contribution of computing resources) of hardware resources 102 for power draw management purposes.

Buses 206 may include one or more physical devices for operably connecting components of data processing system 100. Buses 206 may include, for example, a power bus over which power supplies 104 provide conditioned power to hardware resources 102 and/or other components. Buses 206 may include any number of data buses over which data sent between the components of data processing system 100. The data buses may facilitate, for example, direct communications, side band communications (e.g., between hardware resources managers 202 and corresponding portions of hardware resources 102), interrupt communications (e.g., between power supplies 104 and hardware resources 102), and/or other types of communications.

In an embodiment, hardware resources managers 202 and/or power manager 204 is implemented with a computing device such as a host or server, a personal computer (e.g., desktops, laptops, and tablets), a "thin" client, a personal digital assistant (PDA), a Web enabled appliance, a controller, a system on a chip, an embedded computing device, an out of band management controller, a mobile phone (e.g., Smartphone), and/or any other type of data processing device or system. For additional details regarding computing devices, refer to FIG. 7.

In an embodiment, hardware resources managers 202 and/or power manager 204 operate independently from and manage the operation of hardware resources 102 and power supplies 104. Power manager 204 may manage the operation of hardware resources managers 202.

Power supplies 104, as discussed above, may provide power services. The power services may include (i) drawing power from power sources 210, (ii) processing the power to obtain conditioned power, (iii) providing the conditioned power to other devices such as hardware resources 102, (iv) monitoring input voltage levels from power sources 210, (v) providing information regarding the input voltage levels to power manager 204 (in some embodiments, power manager 204 may obtain information regarding input voltage levels with sensors or other structures, or otherwise independently from power supplies 104), (vi) monitoring input current levels, and/or (vii) throttling hardware resources 102 by sending an interrupt to hardware resources 102 when the input current level exceeds a maximum current level (which may be provided by power manager 204 or obtained from other sources).

To provide its functionality, power supplies 104 may include any number and type of components (e.g., transformers, rectifiers, etc.) to process power from power sources 210, one or more sensors to measure input current, input voltage, output current, output voltage, etc., and/or a computing device such as a host or server, a personal computer (e.g., desktops, laptops, and tablets), a "thin" client, a personal digital assistant (PDA), a Web enabled appliance, a controller, a system on a chip, an embedded computing device, an out of band management controller, a mobile phone (e.g., Smartphone), and/or any other type of data processing device or system. For additional details regarding computing devices, refer to FIG. 7.

In an embodiment, power supplies 104 do not include functionality to limit input current. For example, power supplies 104 may be adapted to output conditioned power up to a predetermined level. When doing so, power supplies 104 may draw any levels of current at any voltage level. The drawn current may generally be related to the quantity of power drawn by hardware resources 102 and/or other components that consume conditioned power (e.g., may be viewed as a variable load by power supplies 104, to which the power supplies 104 adapt their operation). However, in some cases, the drawn current level may increase when the input voltage level is reduced. For example, power supplies 104 may compensate for the reduced input voltage by increasing current drawn through power cables 220.

Figure 3:
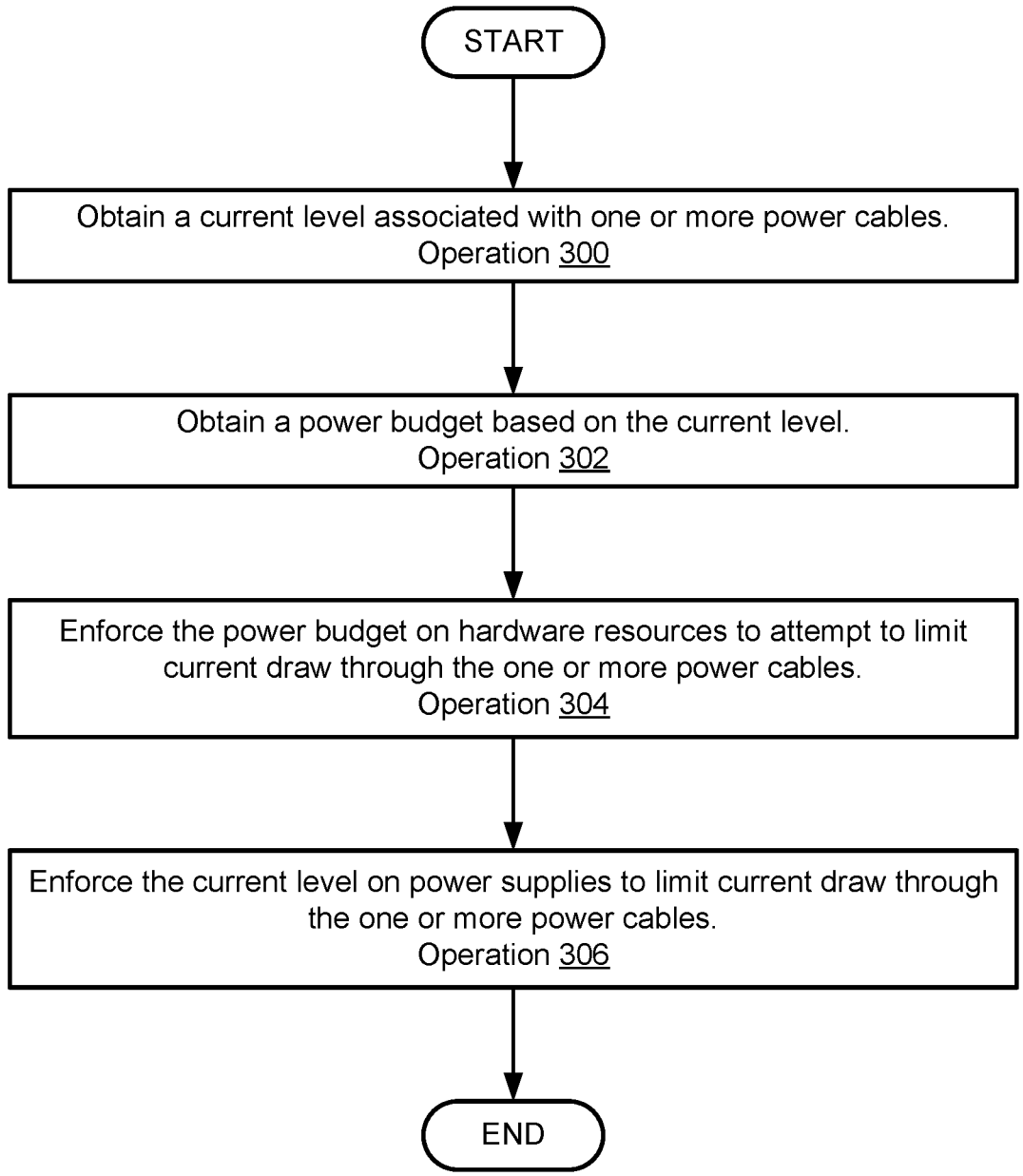
FIG. 3 is a flow diagram illustrating a method of managing current flow in accordance with an embodiment.
Figure 4:
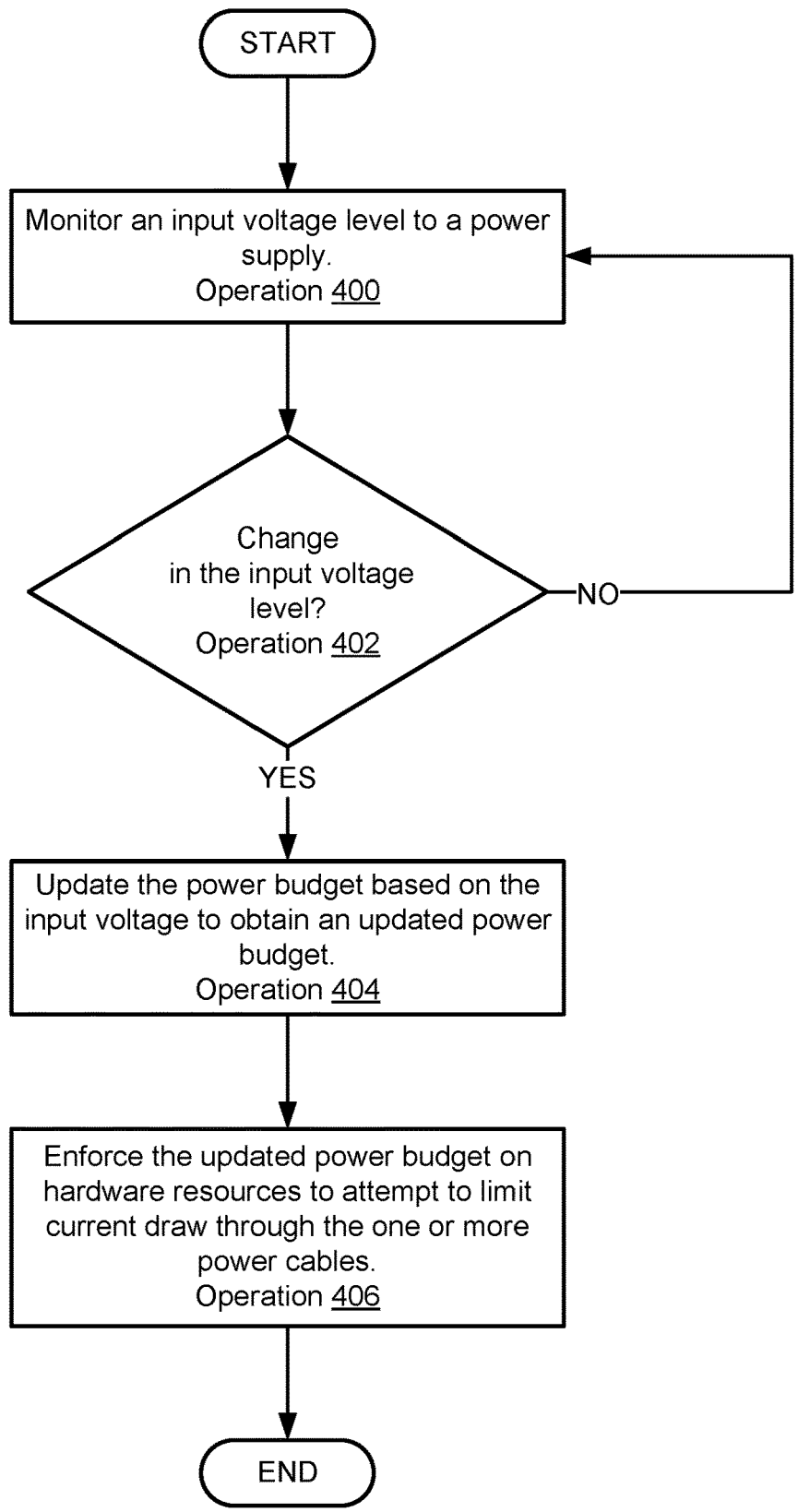
FIG. 4 is a flow diagram illustrating a method of enforcing a power budget in accordance with an embodiment.
Figure 5:
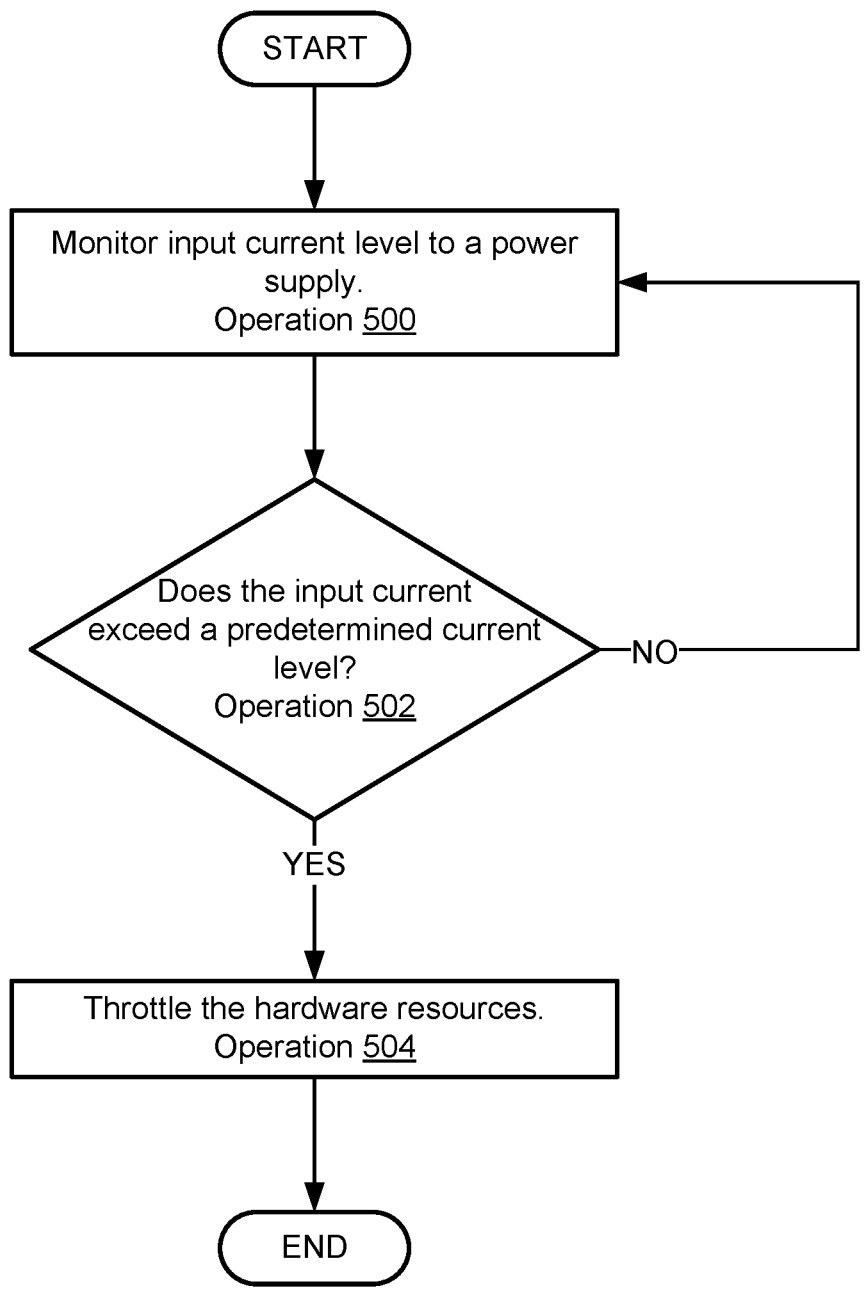
FIG. 5 is a flow diagram illustrating a method of throttling hardware resources in accordance with an embodiment.

When providing their functionalities, the power manager 204, hardware resources, and power supplies 104 may perform all, or a portion, of the methods illustrated in FIGS. 3-5.

Hardware resources 102, as discussed above, may include any number and types of hardware devices that may facilitate computer implemented services. Hardware resources 102 may include functionality to (i) modify their power consumption mechanisms to dynamically change the quantity of power being drawn from buses 206 (e.g., which may result in reduced performance of the hardware resources 102 and/or the computer implemented services), (ii) throttle their performance to substantially reduce power being drawn from buses 206 (e.g., which may suspend and/or reduce performance of the hardware resources 102 and/or the computer implemented services to a greater extent than with modification of the power consumption mechanisms), and (iii) receive/process communications and interrupts from hardware resources managers 202 and/or power supplies 104.

Returning to the discussion of the system illustrated in FIG. 2, power sources 210 may include any number and type of power sources. For example, power sources 210 may include power grids, power generation systems, and/or other systems that may provide power to power supplies 104. In some embodiments, one or more power sources may be in different fault domains from one or more other power sources to reduce the likelihood of total failure to provide power to power supplies 104.

Power cables 220 may include any number and type of power cable, as discussed above. In an embodiment, at least one of the power cables of power cables 220 is a de-rated power cable. The number of power cables 220 may correspond to the number of power supplies 104 (e.g., one power cable per power supply).

While the system of FIG. 2 has been illustrated as including a limited number of specific components, a system may include different numbers, types, and/or quantities of components without departing from the embodiments disclosed herein.

Generally, the components of the system of FIG. 2 may cooperatively perform a current regulation service with respect to current drawn through power cables 220. The current regulation service may provide multiple mechanisms for reducing the likelihood of the current being drawn through power cables 220 exceeding a current level (e.g., a maximum desired current level) while the power supplies 104 may be capable of drawing power at a rate that exceeds the current level.

The current regulation service may include (i) identifying the current level (e.g., which may be stored in power manager 204), (ii) identifying a first current level and a second level as threshold current levels based on the identified current level, the second current level being higher than the first current level, (iii) configuring power supplies 104 to throttle hardware resources 102 if the input current to it exceeds the second current level, (iv) calculating a power budget for the hardware resources 102 based on the current level, (v) updating the power budget based on input voltage level to power supplies 104 and the first current level, and (vi) enforcing the power budget and/or updated power budget on the hardware resources 102. In this manner, if the current drawn by the power supplies 104 exceeds the first current level, then the data processing system 100 may respond by modifying the performance of hardware resources 102 to reduce the drawn current. Further, if the current drawn by the power supplies 104 exceeds the second current level, then the data processing system 100 may respond by throttling the performance of hardware resources 102 to slash the drawn current.

As discussed above, the components of FIG. 1 may perform various methods to reduce the likelihood that current drawn through a power cable exceeds a current level even though a data processing system is capable of drawing more current through the power cable than the current level. FIGS. 3-5 illustrate examples of methods that may be performed by the components of FIG. 1. In the diagrams discussed below and shown in FIGS. 3-5, any of the operations may be repeated, performed in different orders, and/or performed in parallel with or a partially overlapping in time manner with other operations.

Turning to FIG. 3, a flow diagram illustrating a method of operating a power manager in accordance with an embodiment is shown.

At operation 300, a current level associated with one or more power cables is obtained. The current level may specify a maximum current rate which may be drawn through the one or more power cables. The current level may be obtained, for example, by reading it from storage. For example, the currently level may be pre-programmed in the storage. The currently level may be obtained via other methods (e.g., reading it from other locations, inferring it based on identities of the one or more power cables, identifying it based on identities of power supplies or other components of a data processing system, etc.

At operating 302, a power budget based on the current level is obtained. The power budget may be obtained by (i) inventorying power supplies available to supply power to hardware resources and/or other components of a data processing system, (ii) identifying the efficiency of the inventoried power supply, (iii) presuming and/or measuring an input voltage level to the power supplies, (iv) calculating, with the input voltage level and efficiency, a maximum output power by the power supplies that keep current that flows through the one or more power cables and into the power supplies from exceeding the current level obtained in operation 300, and (v) using the maximum output power to obtain the power budget.

For example, consider a scenario where a data processing system includes 2 power supplies (each rated at 1500 watts) with 90% efficiency, and each power supply being connected to power sources that nominally supply 120 volts with power cables having a current level of 10 amps. In such a scenario, the maximum output power may be 2160 watts (e.g., 2*120*10*0.9=2160) even though the combined power supplies are rated at 3000 watts. The power budget may take into account a factor of safety which may reduce it from the maximum output power (e.g., 5% for example, thereby reducing the power budget to 2052 watts).

The power budget may presume a nominal or measured input voltage at a predetermined point in time. Because the input power may vary over time due to many factors, the power budget may be updated over time, discussed below with respect to the discussion of FIG. 4.

Additionally, when inventorying the power supplies, the power manager may deactivate one or more of the power supplies. For example, if any of the power supplies are not able to monitor, send interrupts based on input current measurements, and/or allow for their configuration may be disabled. This determination may be made by, for example, reading identifiers or other information from the power supplies (e.g., controllers of the power supplies may store and provide copies of such information upon request). Power supplies that are not capable of providing the requested information may be deactivated. These deactivations may be taken into account in the power budget.

At operation 304, the power budget is enforced on hardware resources to attempt to limit current draw through the one or more power cables. The power budget may be enforced by sending information regarding the power budget to hardware resources managers 202. The hardware resources managers 202 may select and/or invoke various power consumption mechanisms of the hardware resources to limit the power drawn by the hardware resources based on the power budget.

In an embodiment, the hardware resources managers 202 select and invoke power resource consumption mechanisms based on the computer implemented services provided by the hardware resources. For example, the hardware resources managers 202 may monitor the use of various hardware resources (e.g., whether idling and/or active) over time and preferentially select and invoke power consumption mechanisms of the hardware resources that are more likely to be idling than active (if possible) based on past use to enforce the power budget on the hardware resources.

At operation 306, the current level obtained in operation 300 is enforced on power supplies to limit current draw through the one or more power cables. The current level may be enforced by configuring active power supplies (that were not deactivated in operations 302) based on the current level to issue interrupts when the power supply measures a current level that exceeds a threshold current level (e.g., a second current level, discussed above). The interrupts may be issued to one or more of the hardware resources thereby causing the hardware resources to throttle their performance and corresponding power consumption.

The method may end following operation 306.

Turning to FIG. 4, a flow diagram illustrating a method of updating a power budget in accordance with an embodiment is shown. As discussed above, power budgets may be updated over time due to, for example, changes in input voltage levels to power supplies.

At operation 400, an input voltage level to a power supply is monitored. The input voltage level may be monitored by reading the input voltage level with a sensor or obtaining the input voltage level from another entity (e.g., from the power supply).

At operation 402, it is determined whether the input voltage to the power supply changed (e.g., from a previous measurement). Such a change may indicate a change in the relationship between power consumed by hardware components and current drawn through a power cable that provides input current and voltage to the power supply.

For example, consider a scenario where a data processing system includes 2 power supplies (each rated at 1500 watts) with 90% efficiency, and each power supply being connected to power sources that nominally supply 120 volts with power cables having a current level of 10 amps, as discussed above with respect to operation 302. Now consider that the input voltage drops to 110 volts (e.g., due to change in the operation of the power sources) while the power budget is 2160 watts. In such a scenario, the current drawn through the power cable may increase to 10.9 amps (e.g., 2160/2/0.9/110=10.9) thereby exceeding the current level for each cable. In contrast, if the voltage level increases, then the current through each cable may further decrease. In these calculations, the determined current level through the cables may be considered to be an estimate of the actual current since the current through the cables is not being measured directly.

If the input voltage level changed, then the method may proceed to operation 404. If the input voltage level did not change, then the method may return to operation 400.

At operation 404, the power budget may be updated based on the input voltage to obtain an updated power budget. The power budget may be updated by repeating calculations similar to those described with respect to operation 302, but may utilize the input voltage level rather than a nominal level. In an embodiment, the updated power budget is reduced when the input voltage level decreases whereas the updated power budget is increased when the input voltage level increases.

At operation 406, the updated power budget is enforced on the hardware resources to attempt to limit current drawn through the one or more power cables. The updated power budget may be enforced similarly to that described with respect to the power budget in operation 304.

The method may end following operation 406.

The method may end following operation 306.

Turning to FIG. 5, a flow diagram illustrating a method of responding to current draw through a power cable in accordance with an embodiment is shown.

At operation 500, an input current level to a power supply is monitored. The input current level may be monitored by the power supply (e.g., the power supply may include a current sensor usable to monitor its input current). The input current level may be presumed to match a current being drawn through a power cable that supplies power to the power supply, and may have a specific current level to which the power supply is configured to respond. For example, a controller of the power supply may be configured to automatically monitor the input current level and take action when it exceeds a current level stored in memory and/or persistent storage of the controller.

At operation 502, it is determined whether the input current to the power supply exceeds a predetermined current level. The predetermined current level may be the current level stored in the controller, discussed above.

If the input current level exceeds the predetermined current level, then the method may proceed to operation 504. If the input voltage level does not exceed the predetermined current level, then the method may return to operation 500.

At operation 504, hardware resources are throttled. The hardware resources may be throttled by sending an interrupt to all, or a portion, of the hardware resources. The hardware resources may automatically throttle their performance and corresponding power consumption in response to receiving the interrupt.

In an embodiment, the interrupt specifies or otherwise indicates a duration of the throttle. The duration may be, for example, for a predetermined quantity of time (e.g., during which the method of FIG. 4 may be performed/completed) or may be until another interrupt indicating that the throttling is to be terminated is received.

The method may end following operation 504.

To further clarify embodiments disclosed herein, diagrams illustrating example operations are illustrated in FIGS. 6A-6H. These figures illustrate, in part, an example of data processing system. Specifically, a data processing system implemented as a server 600 is illustrated. Server 600 may include processor 602 (e.g., hardware resources), an out of band controller 604 (e.g., a hardware resources manager) that manages processor 602, two power supplies 606A, 606B, a chassis manager 608 (e.g., a power manager) that manages the use of power in the server 600 to prevent current drawn through power cables 610 from exceeding a predetermined current level, and buses 601 that facilitate distribution of power and operable connections between the components of server 600.

Power supplies 606A, 606B may be operably connected to respective power sources 620A, 620B with power cables 610. The power supplies 606A, 606B and power sources 620A, 620B may be capable of driving a larger amount of current through power cables 610 than specified by the current level for the power cables 610. Consequently, absent embodiments disclosed herein, the power cables 610 may operate in an undesired manner by carrying larger amounts of current than specified by the current level for the power cables 610. For example, the current level may be set by a regulation based on a diameter of wire used to implement power cables 610 while the connectors of power cables 610 may indicate or be compatible with higher current flow rates (e.g., making power cables 610 de-rated cables).

Figure 6A:
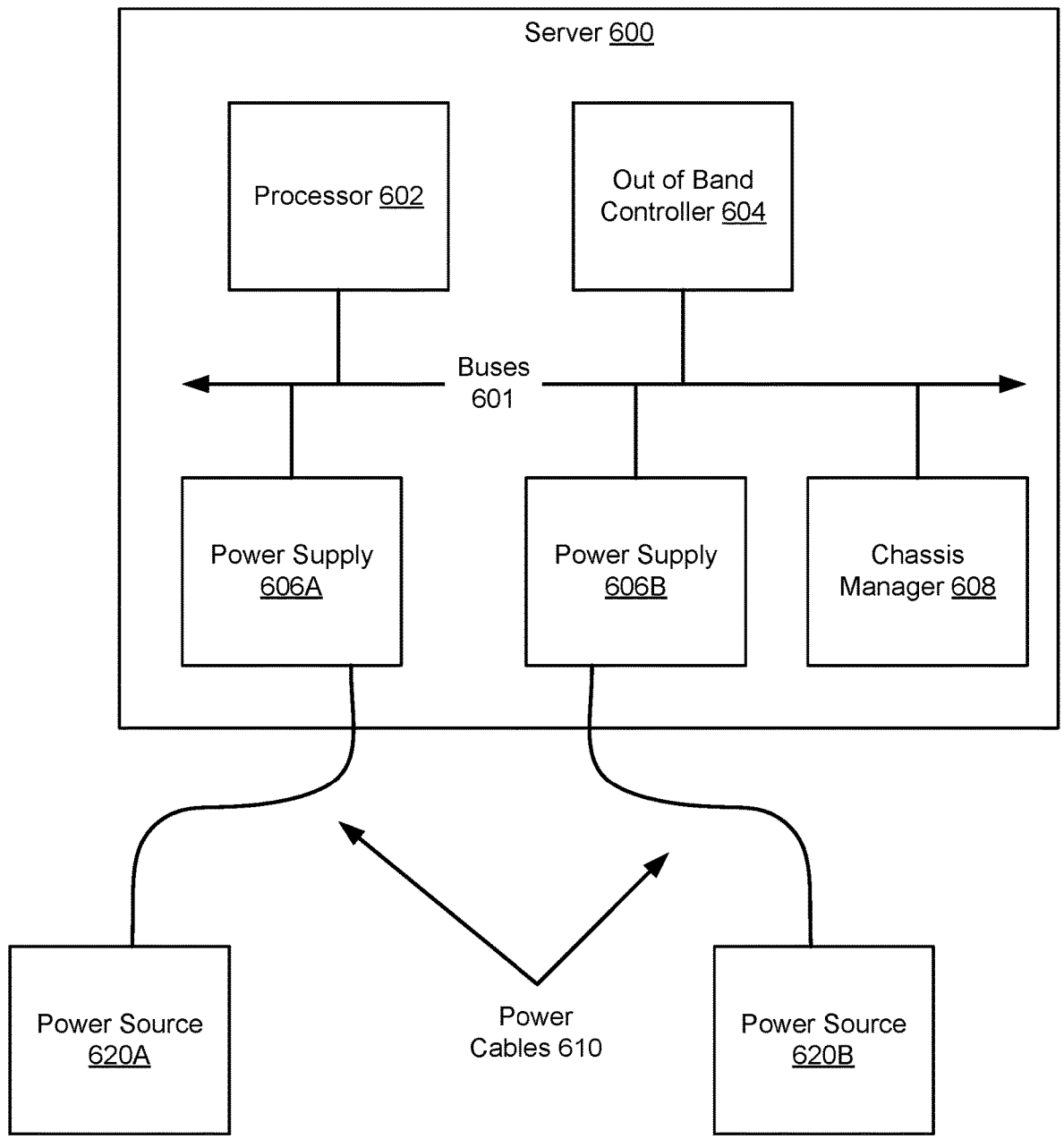
FIGS. 6A-6H are diagrams illustrating an example system at different points in time in accordance with an embodiment.

Turning to FIG. 6A, at a first point in time, server 600 may initially power-on thereby initiating current draw through power cables 610. To prepare to manage current draw, server 600 may inventory power supplies and/or perform other actions to generate a power budget. For the purposes of this example, power supplies 606A, 606B are configurable. Accordingly, chassis manager 608 does not disable either power supply.

Figure 6B:
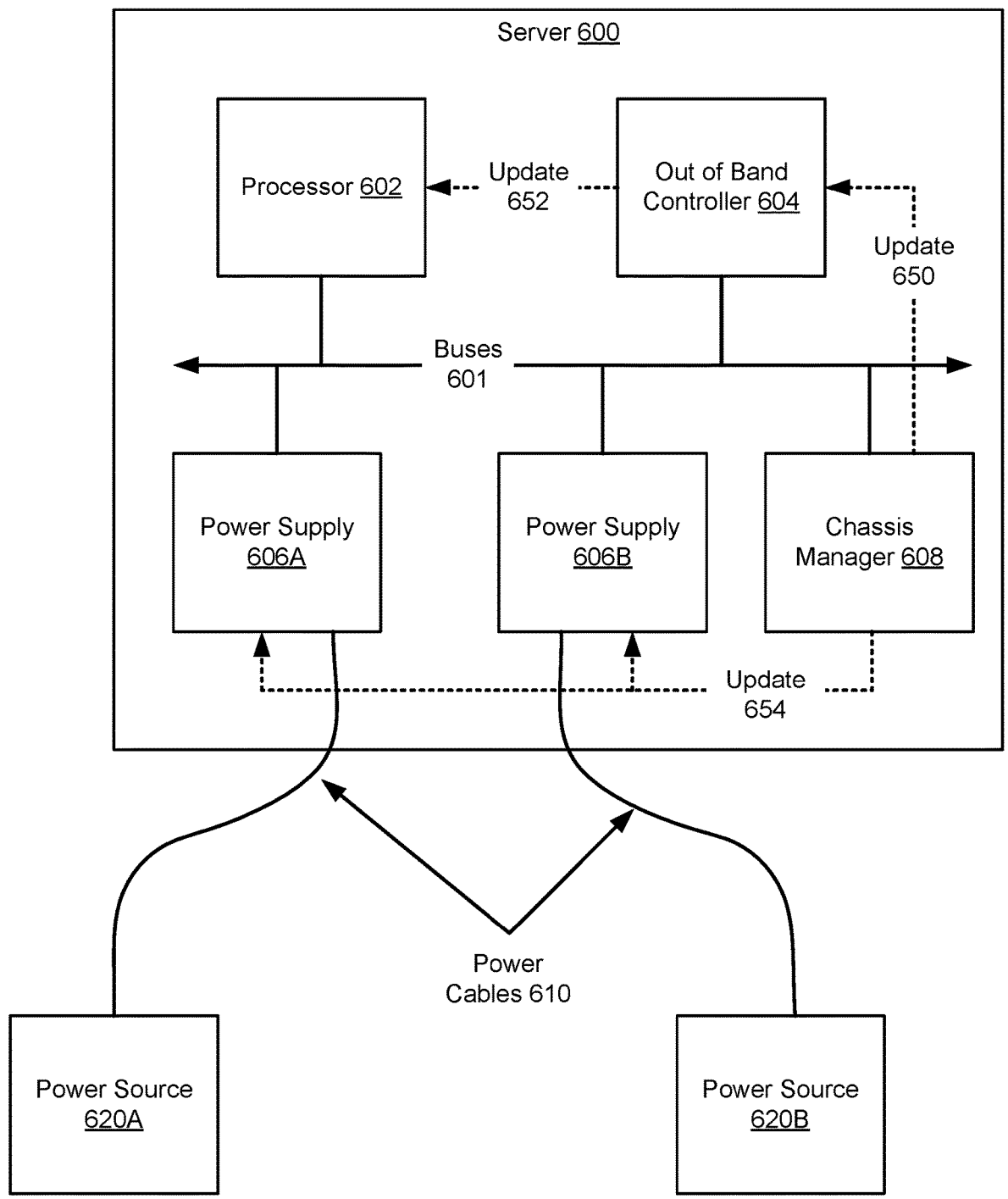

Turning to FIG. 6B, to manage the current draw, chassis manager 608 generates and sends update 650 to out of band controller 604. Update 650 specifies a power budget for processor 602. In response, out of band controller 604 selects a power consumption mechanism of processor 602 (e.g., frequency), generates update 652, and sends update 652 to reconfigure processor 602 to limit power draw as specified in the power budget.

Chassis manager 608 also generates and send update 654 to power supplies 606A, 606B. Update 654 indicates the input current level at which the power supplies are to send an interrupt to processor 602.

Figure 6C:
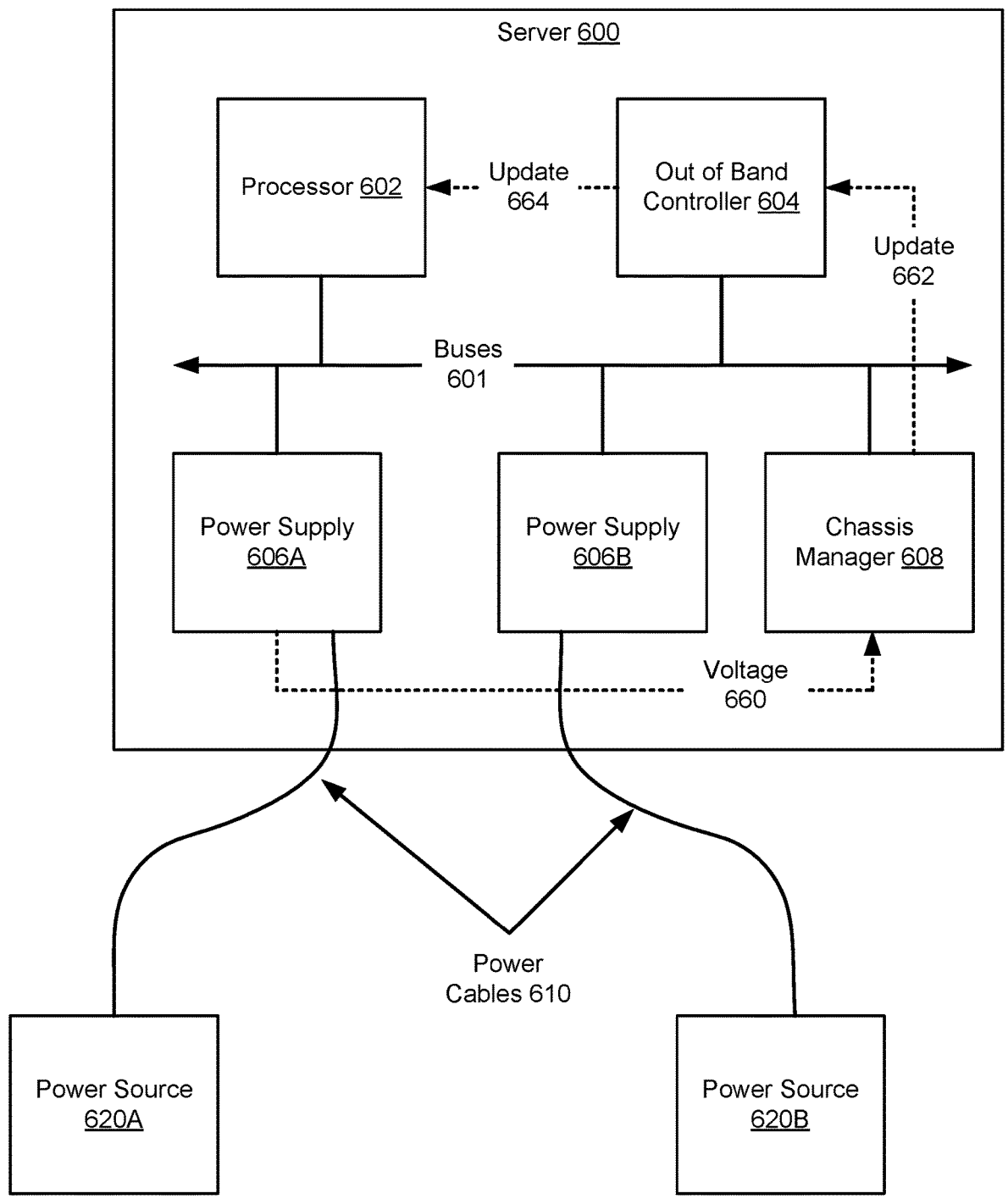

Turning to FIG. 6C, after sending the updates, chassis manager 608 monitors input voltage 660 for power supply 606A and determines that voltage 660 has decreased. In response to the determination, chassis manager 608 updates the power budget (which is reduced compared to the original power budget) and sends update 662 to out of band controller 604. Update 662 is based on the updated power budget.

Out of band controller 604 uses the power budget to generate update 664 which further modifies the operation of processor 602 to meet the updated power budget.

Figure 6D:
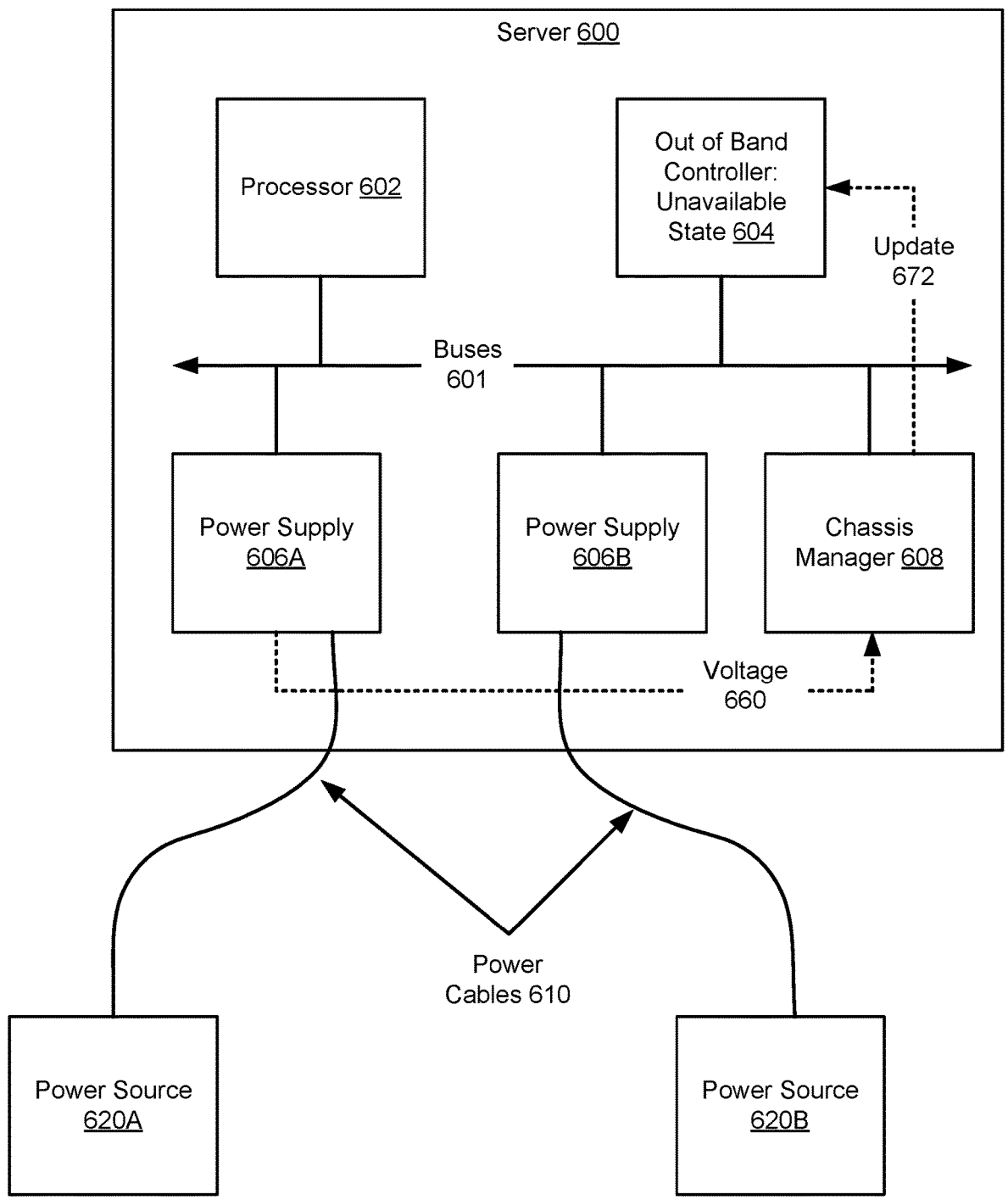

Turning to FIG. 6D, at a second point in time, out of band controller 604 begins to perform a self-update placing it in an unavailable state. However, while in the unavailable state, voltage 660 further reduces in magnitude. Consequently, chassis manager 608 generates a further updated power budget (which is further reduced when compared to the updated power budget), prepares update 672 based on the further updated power budget, and sends update 672 to out of band controller 604. However, because out of band controller 604 is in the unavailable state, it does not update operation of processor 602 thereby resulting in the power drawn into power supply 606A to increase without abatement.

Figure 6E:
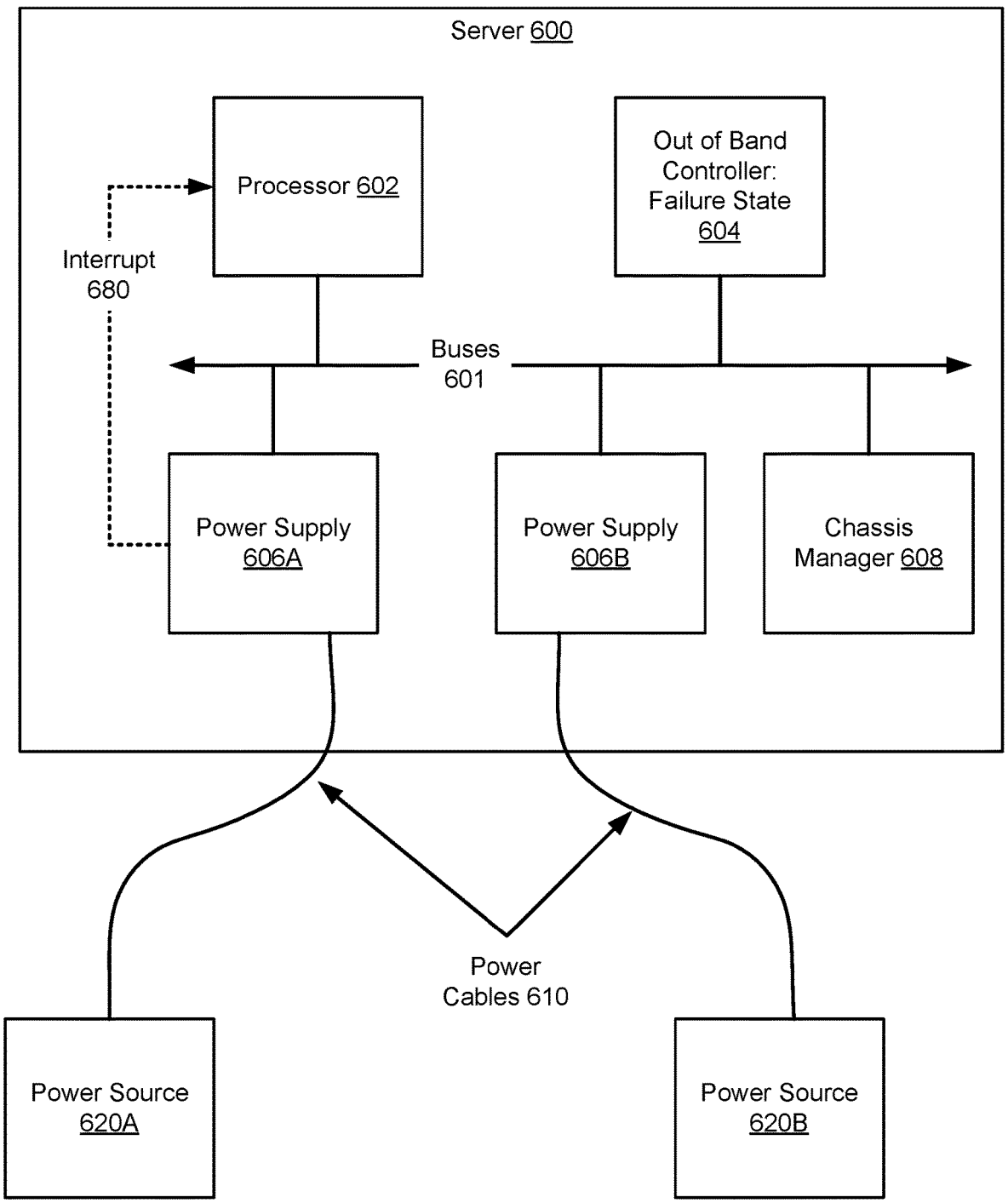

Turning to FIG. 6E, power supply 606A continues to monitor its input current and, when it exceeds the predetermine current level, generates and sends interrupt 680 to processor 602 to throttle processor 602. The throttle reduces power consumption by processor 602 which reduces the input current to power supply 606A below the predetermined current level.

Figure 6F:
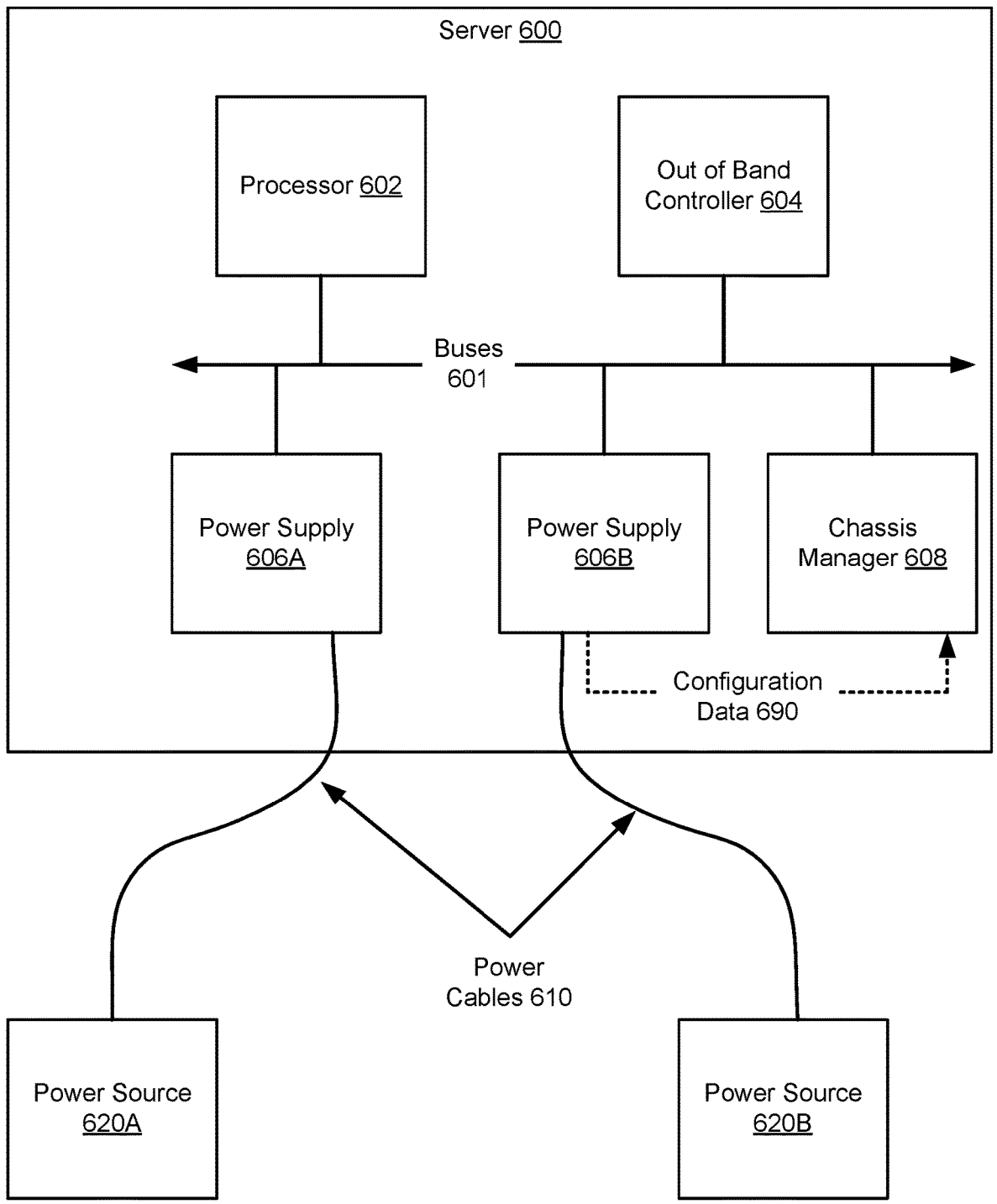

Turning to FIG. 6F, now consider a scenario where, during the power budget calculation process, power supply 606B sends configuration data 690 to chassis manager 608. The configuration data 690 indicates that power supply 606B cannot be configured or otherwise utilized by chassis manager 608 to manage the current drawn through power cables 610. If left operating, power supply 606B may draw more current through a power cable of the power cables 610 than specified by the predetermined current level.

Figure 6G:
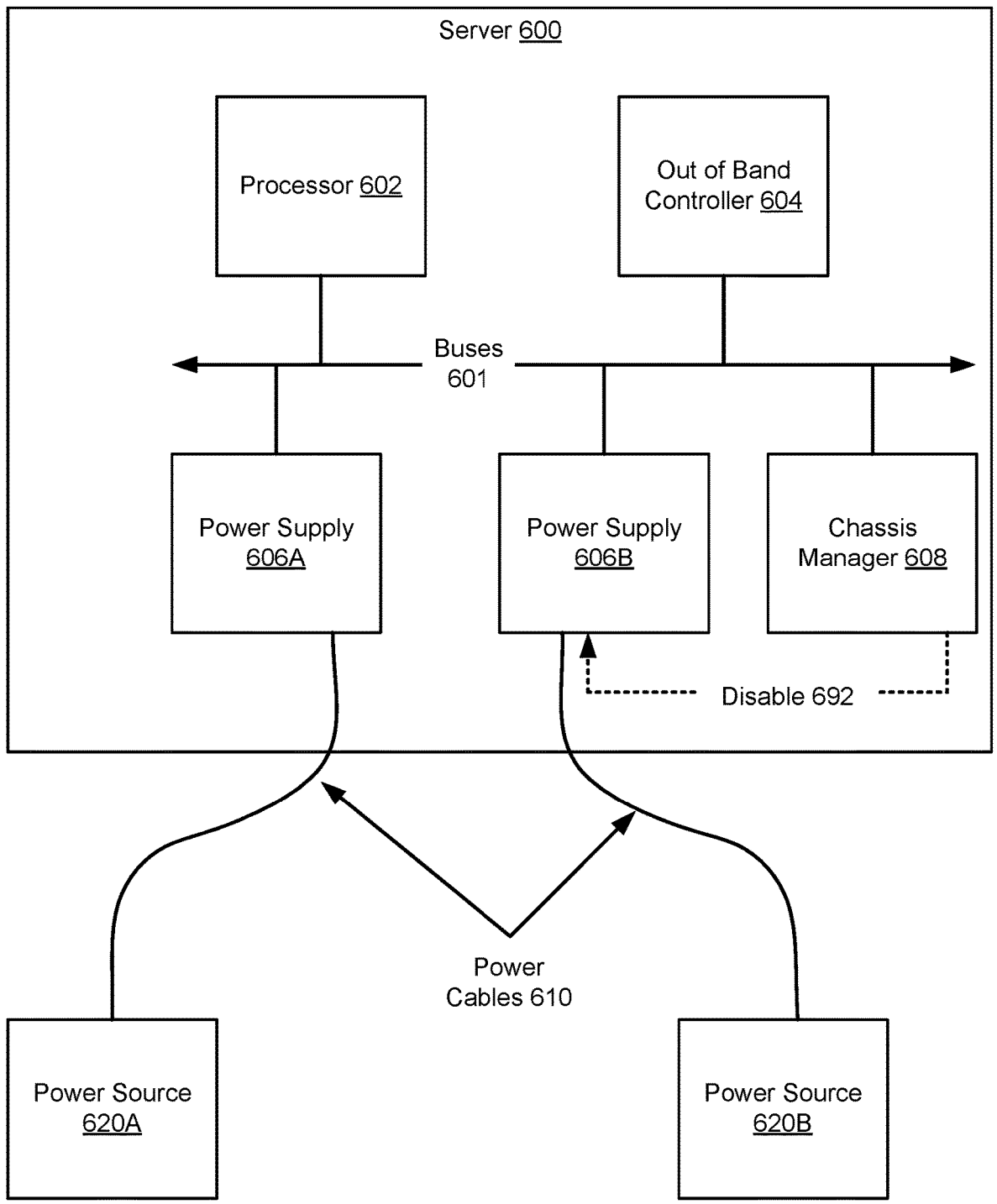

Turning to FIG. 6G, in response to the configuration data, chassis manager 608 sends disable 692 to power supply 606B to disable it. Consequently, it will not be allowed to draw current through the cable thereby preventing current draw through the cable from exceeding the predetermined current level.

Figure 6H:
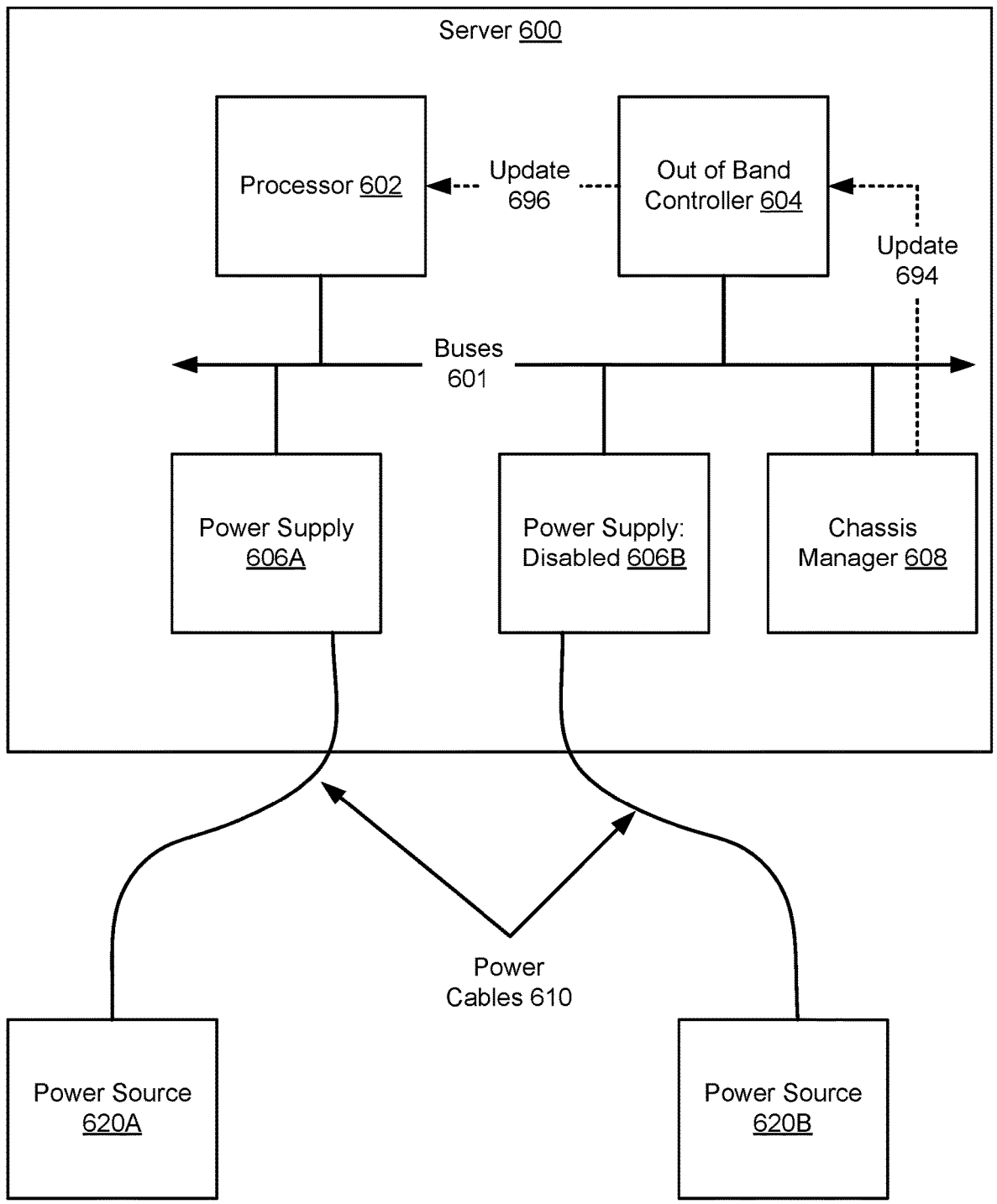

Turning to FIG. 6H, based on disable 692, chassis manager 608 calculates a power budget for processor 602 based on only power supply 606A being available to supply power and only its corresponding power cable through which power is received from power source 620A. Consequently, when updates 694 and 696 are sent to configure processor 602, the power budget is reduced when compared to the power budget when both power supplies 606A, 606B were operating (which may reduce the current drawn through the respective power cables by dividing it across them).

Thus, as described and illustrated above, embodiments disclosed herein may provide a system and method with multiple separate and independent mechanisms that may limit current drawn through de-rated power cables (or other types of power cables). The mechanisms may be independent form one another thereby allowing failure of one mechanism without resulting in the current draw being unregulated.

Figure 7:
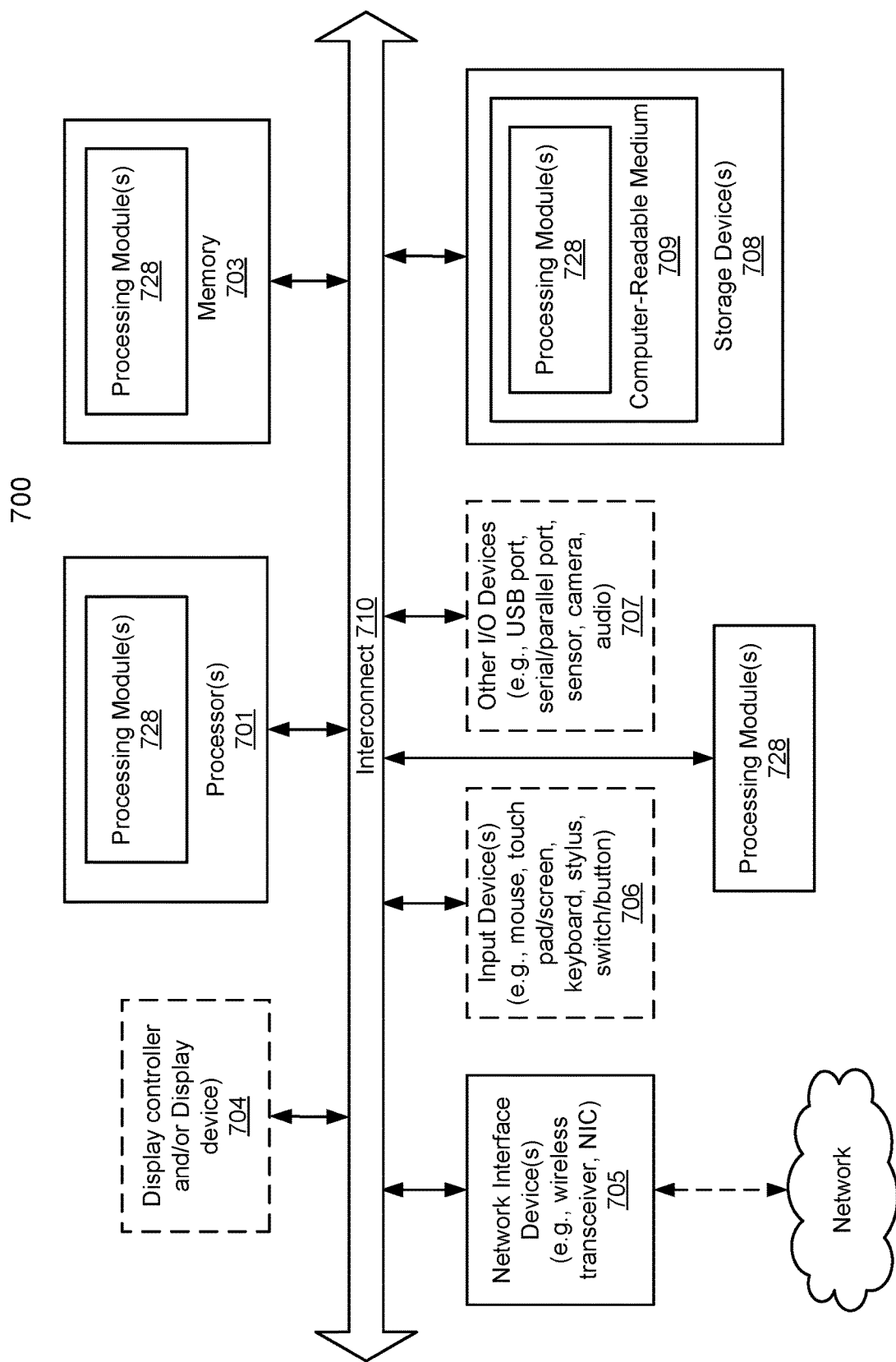
FIG. 7 is a block diagram illustrating a data processing system in accordance with an embodiment.

Any of the components illustrated in FIGS. 1-6G may be implemented with one or more computing devices. Turning to FIG. 7, a block diagram illustrating an example of a data processing system (e.g., a computing device) in accordance with an embodiment is shown. For example, system 700 may represent any of data processing systems described above performing any of the processes or methods described above. System 700 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 700 is intended to show a high level view of many components of the computer system. However, it is to be understood that additional components may be present in certain implementations and furthermore, different arrangement of the components shown may occur in other implementations. System 700 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 700 includes processor 701, memory 703, and devices 705-708 via a bus or an interconnect 710. Processor 701 may represent a single processor or multiple processors with a single processor core or multiple processor cores included therein. Processor 701 may represent one or more general-purpose processors such as a microprocessor, a central processing unit (CPU), or the like. More particularly, processor 701 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 701 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 701, which may be a low power multi-core processor socket such as an ultra-low voltage processor, may act as a main processing unit and central hub for communication with the various components of the system. Such processor can be implemented as a system on chip (SoC). Processor 701 is configured to execute instructions for performing the operations discussed herein. System 700 may further include a graphics interface that communicates with optional graphics subsystem 704, which may include a display controller, a graphics processor, and/or a display device.

Processor 701 may communicate with memory 703, which in one embodiment can be implemented via multiple memory devices to provide for a given amount of system memory. Memory 703 may include one or more volatile storage (or memory) devices such as random access memory (RAM), dynamic RAM (DRAM), synchronous DRAM (SDRAM), static RAM (SRAM), or other types of storage devices. Memory 703 may store information including sequences of instructions that are executed by processor 701, or any other device. For example, executable code and/or data of a variety of operating systems, device drivers, firmware (e.g., input output basic system or BIOS), and/or applications can be loaded in memory 703 and executed by processor 701. An operating system can be any kind of operating systems, such as, for example, Windows® operating system from Microsoft®, Mac OS/iOS from Apple, Android® from Google®, Linux®, Unix®, or other real-time or embedded operating systems such as VxWorks.

System 700 may further include IO devices such as devices (e.g., 705, 706, 707, 708) including network interface device(s) 705, optional input device(s) 706, and other optional IO device(s) 707. Network interface device(s) 705 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 706 may include a mouse, a touch pad, a touch sensitive screen (which may be integrated with a display device of optional graphics subsystem 704), a pointer device such as a stylus, and/or a keyboard (e.g., physical keyboard or a virtual keyboard displayed as part of a touch sensitive screen). For example, input device(s) 706 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 707 may include an audio device. An audio device may include a speaker and/or a microphone to facilitate voice-enabled functions, such as voice recognition, voice replication, digital recording, and/or telephony functions. Other IO devices 707 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 707 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 710 via a sensor hub (not shown), while other devices such as a keyboard or thermal sensor may be controlled by an embedded controller (not shown), dependent upon the specific configuration or design of system 700.

To provide for persistent storage of information such as data, applications, one or more operating systems and so forth, a mass storage (not shown) may also couple to processor 701. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 701, e.g., via a serial peripheral interface (SPI). This flash device may provide for non-volatile storage of system software, including a basic input/output software (BIOS) as well as other firmware of the system.

Storage device 708 may include computer-readable storage medium 709 (also known as a machine-readable storage medium or a computer-readable medium) on which is stored one or more sets of instructions or software (e.g., processing module, unit, and/or processing module/unit/logic 728) embodying any one or more of the methodologies or functions described herein. Processing module/unit/logic 728 may represent any of the components described above. Processing module/unit/logic 728 may also reside, completely or at least partially, within memory 703 and/or within processor 701 during execution thereof by system 700, memory 703 and processor 701 also constituting machine-accessible storage media. Processing module/unit/logic 728 may further be transmitted or received over a network via network interface device(s) 705.

Computer-readable storage medium 709 may also be used to store some software functionalities described above persistently. While computer-readable storage medium 709 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 728, components and other features described herein can be implemented as discrete hardware components or integrated in the functionality of hardware components such as ASICS, FPGAs, DSPs or similar devices. In addition, processing module/unit/logic 728 can be implemented as firmware or functional circuitry within hardware devices. Further, processing module/unit/logic 728 can be implemented in any combination hardware devices and software components.

Note that while system 700 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments of the invention as described herein.

In the foregoing specification, embodiments have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A data processing system to provide computer implemented services, the data processing system comprising:

a power supply adapted to provide conditioned power using power from a power source;
a power cable through which the power supply receives the power while the power cable is operably connected to the power supply and the power source;
hardware resources adapted to:
  provide the computer implemented services while the data processing system is operating; and
  consume a portion of the conditioned power to provide the computer implemented services;
a power manager adapted to:
  estimate an input current to the power supply that flows through the power cable; and
  gracefully reduce performance of the hardware resources when the estimated input current exceeds a first current level;
wherein the power supply is adapted to:
  monitor the input current; and
  throttle the performance of the hardware resources when the input current exceeds a second current level, the second current level being larger than the first current level.

2. The data processing system of claim 1, wherein the power supply is adapted to receive a larger quantity of the input current than a quantity of current specified by the second current level.

3. The data processing system of claim 1, wherein the power manager is further adapted to:
  obtain a power budget for the hardware resources based on a third current level associated with the power cable; and
  limit power consumption by the hardware resources based on the power budget.

4. The data processing system of claim 3, wherein limiting the power consumption by the hardware resources based on the power budget comprises:
  obtaining the estimated input current based, at least in part, on the power budget and an input voltage to the power supply;
  when the estimated input current exceeds the first current level, reducing the power budget to obtain an updated power budget;
  when the estimated input current does not exceed the first current level, maintaining the power budget to obtain the updated power budget; and
  enforcing the updated power budget on the hardware resources.

5. The data processing system of claim 4, further comprising:
  a hardware resources manager adapted to:
    obtain information regarding the updated power budget;
    send a communication to a portion of the hardware resources via a sideband interface, the communication indicating a power consumption limit for the portion of the hardware resources, and the power consumption limit being based on the updated power budget.

6. The data processing system of claim 5, wherein throttle the performance of the hardware resources comprises sending an interrupt to a portion of the hardware resources, the interrupt being adapted to cause the portion of the hardware resources to reduce power consumption without consideration regarding impacts on the computer implemented services.

7. The data processing system of claim 6, wherein gracefully reducing performance of the hardware resources comprises:
  identifying power consumption reduction mechanisms of the hardware resources;
  selecting a portion of the power consumption reduction mechanisms based on the computer implemented services; and
  invoking the portion of the power consumption reduction mechanisms to limit power consumption of the hardware resources based on the updated power budget without throttling the computer implemented services.

8. The data processing system of claim 3, wherein obtaining the power budget comprises:
  identifying a quantity of power supplies that will supply the conditioned power to the hardware resources;
  identifying an efficiency of each power supply of the power supplies;
  calculating a maximum quantity of receivable power based on the based on the third current level;
  calculating a maximum quantity of output power for the power supplies based on the maximum quantity of receivable power and the efficiency; and
  setting the power budget based on the maximum quantity of the output power for the power supplies.

9. The data processing system of claim 1, further comprising:
  a second power supply adapted to provide the conditioned power using second power from a second power source; and
  a second power cable through which the second power supply receives the second power while the second power cable is operably connected to the second power supply and the second power source.

10. The data processing system of claim 9, wherein the power manager is further adapted to:
  configure the power supply to throttle the performance of the hardware resources when the input current exceeds the second current level;
  make a determination that the second power supply is not configurable to throttle the performance of the hardware resources; and
  disable the second power supply based on the determination.

11. The data processing system of claim 9, wherein the power manager is further adapted to:
  estimate an aggregate input current to the power supply and the second power supply;
  obtain the estimated input current based on the estimated aggregate input current;
  obtain a second estimated input current based on the estimated aggregate input current, the second estimated input current being associated with the second power supply; and
  gracefully reduce the performance of the hardware resources when the second estimated input current exceeds the first current level.

12. The data processing system of claim 1, wherein the power supply is unable to limit the input current below the first current level and the second current level.

13. A computer implemented method of managing power drawn through a power cable that supplies power to a power supply that powers hardware resources that provide computer implemented services, the method comprising:

estimating, by a power manager, an input current to the power supply, the input current flows through the power cable between the power supply and a power source;

monitoring, by the power supply, the input current;

gracefully reducing, by the power manager, performance of the hardware resources when the estimated input current exceeds a first current level to attempt to reduce a quantity of the input current to be below the first current level; and throttling, by the power supply, the performance of the hardware resources when the input current exceeds a second current level, the second current level being larger than the first current level.

14. The method of claim 13, further comprising:

obtain, by the power manager, a power budget for the hardware resources based on a third current level associated with the power cable; and limiting, by the power manager, power consumption by the hardware resources based on the power budget.

15. The method of claim 14, wherein limiting the power consumption by the hardware resources based on the power budget comprises:

obtaining the estimated input current based, at least in part, on the power budget and an input voltage to the power supply;

when the estimated input current exceeds the first current level, reducing the power budget to obtain an updated power budget;

when the estimated input current does not exceed the first current level, maintaining the power budget to obtain the updated power budget; and enforcing the updated power budget on the hardware resources.

16. The method of claim 15, wherein gracefully reducing performance of the hardware resources comprises:

identifying power consumption reduction mechanisms of the hardware resources;

selecting a portion of the power consumption reduction mechanisms based on the computer implemented services; and invoking the portion of the power consumption reduction mechanisms to limit power consumption of the hardware resources based on the updated power budget without throttling the computer implemented services.

17. The method of claim 14, wherein obtaining the power budget comprises:

identifying a quantity of power supplies that will supply conditioned power to the hardware resources;

identifying an efficiency of each power supply of the power supplies;

calculating a maximum quantity of receivable power based on the third current level;

calculating a maximum quantity of output power for the power supplies based on the maximum quantity of receivable power and the efficiency; and setting the power budget based on the maximum quantity of the output power for the power supplies.

18. The method of claim 13, further comprising:

configuring, by the power manager, the power supply to throttle the performance of the hardware resources when the input current exceeds the second current level;

making a determination that a second power supply adapted to supply power to the hardware resources is not configurable to throttle the performance of the hardware resources; and disabling the second power supply based on the determination.

19. The method of claim 18, further comprising:

estimating an aggregate input current to the power supply and the second power supply;

obtaining the estimated input current based on the estimated aggregate input current;

obtaining a second estimated input current based on the estimated aggregate input current, the second estimated input current being associated with the second power supply; and gracefully reduce the performance of the hardware resources when the second estimated input current exceeds the first current level.

20. The method of claim 13, wherein the power supply is unable to limit the input current below the first current level and the second current level.

* * * * *

UNITED STATES PATENT AND TRADEMARK OFFICE
CERTIFICATE OF CORRECTION

| | |
|---|---|
| PATENT NO. | : 12,135,528 B2 |
| APPLICATION NO. | : 17/495509 |
| DATED | : November 5, 2024 |
| INVENTOR(S) | : Geoffrey Allen Dillon and Craig Anthony Klein |

Page 1 of 1

It is certified that error appears in the above-identified patent and that said Letters Patent is hereby corrected as shown below:

In the Claims

Claim 8, Column 18, Line 21, the sentence "based on the based on the third current level" should read -- based on the third current level --.

Signed and Sealed this
Seventeenth Day of December, 2024

Derrick Brent
*Acting Director of the United States Patent and Trademark Office*